United States Patent
Irie

(10) Patent No.: US 9,467,612 B2
(45) Date of Patent: Oct. 11, 2016

(54) CAMERA BODY, MOUNT ADAPTER, AND METHODS OF CONTROLLING OPERATION OF SAME

(71) Applicant: FUJIFILM Corporation, Tokyo (JP)

(72) Inventor: Fuminori Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/822,510

(22) Filed: Aug. 10, 2015

(65) Prior Publication Data

US 2016/0037050 A1 Feb. 4, 2016

Related U.S. Application Data

(63) Continuation of application No. PCT/JP2013/083835, filed on Dec. 18, 2013.

(30) Foreign Application Priority Data

Mar. 21, 2013 (JP) .................. 2013-057669

(51) Int. Cl.
*H04N 5/225* (2006.01)
*H04N 5/232* (2006.01)
(Continued)

(52) U.S. Cl.
CPC .......... *H04N 5/23209* (2013.01); *G03B 17/14* (2013.01); *G03B 17/18* (2013.01); *H04N 5/217* (2013.01); *H04N 5/2254* (2013.01); *H04N 5/23229* (2013.01); *H04N 5/23293* (2013.01);
(Continued)

(58) Field of Classification Search
CPC . H04N 5/2254; H04N 5/23209; G03B 17/14
See application file for complete search history.

(56) References Cited

U.S. PATENT DOCUMENTS

| 4,572,638 A * | 2/1986 | Nakai | ...................... G03B 7/20 |
| | | | 348/E5.044 |
| 4,935,760 A * | 6/1990 | Kojima | .................. G03B 17/14 |
| | | | 396/341 |

(Continued)

FOREIGN PATENT DOCUMENTS

| JP | 01-248115 A | 10/1989 |
| JP | 11-344756 A | 12/1999 |

(Continued)

OTHER PUBLICATIONS

International Search Report issued in PCT/JP2013/083835 dated on Mar. 4, 2014.

(Continued)

*Primary Examiner* — Twyler Haskins
*Assistant Examiner* — Dwight C Tejano
(74) *Attorney, Agent, or Firm* — Birch, Stewart, Kolasch & Birch, LLP

(57) ABSTRACT

An image captured using a lens mounted via a mount adapter is corrected in simple fashion in accordance with the lens. An interchangeable lens is mounted on a camera body via the mount adapter. The mount adapter is provided with a slide switch capable of setting a lens type that corresponds to the interchangeable lens. The slide switch is positioned in accordance with the interchangeable lens. The switch setting state of the positioned slide switch is detected in the camera body. Correction parameters that conform to the detected switch setting state are read out of a memory within the camera body. The captured image is corrected using the correction parameters that have been read out.

10 Claims, 17 Drawing Sheets

(51) Int. Cl.
   *G03B 17/14* (2006.01)
   *G03B 17/18* (2006.01)
   *H04N 5/217* (2011.01)
   *H04N 5/357* (2011.01)

(52) U.S. Cl.
   CPC ......... *H04N 5/3572* (2013.01); *G03B 2206/00* (2013.01)

(56) References Cited

U.S. PATENT DOCUMENTS

| | | | |
|---|---|---|---|
| 5,068,680 A * | 11/1991 | Kawasaki | G03B 17/14 396/71 |
| 5,257,058 A * | 10/1993 | Mabuchi | G03B 17/14 348/240.3 |
| 6,407,774 B1 * | 6/2002 | Mabuchi | H04N 5/23209 348/335 |
| 6,947,092 B1 | 9/2005 | Nagata et al. | |
| 2005/0025472 A1 * | 2/2005 | Sugita | G03B 17/565 396/71 |
| 2006/0098114 A1 * | 5/2006 | Horii | H04N 5/2254 348/360 |
| 2006/0165401 A1 * | 7/2006 | Doi | G03B 17/14 396/71 |
| 2006/0291842 A1 * | 12/2006 | Tokiwa | G03B 17/14 396/56 |
| 2011/0229114 A1 * | 9/2011 | Okada | G03B 17/14 396/71 |
| 2012/0033955 A1 | 2/2012 | Okada | |
| 2013/0077952 A1 * | 3/2013 | Sugiyama | G03B 17/56 396/530 |

FOREIGN PATENT DOCUMENTS

| | | |
|---|---|---|
| JP | 2005-012427 A | 1/2005 |
| JP | 2008-092440 A | 4/2008 |
| JP | 2012-037692 A | 2/2012 |

OTHER PUBLICATIONS

Written Opinion of the International Searching Authority issued in PCT/JP2013/083835 (PCT/ISA/237) dated on Mar. 4, 2014.

* cited by examiner

Fig. 3

| SWITCH SETTING STATE | DISTORTION ABERRATION CORRECTION | COLOR SHADING CORRECTION | PERIPHERAL LIGHT QUANTITY | SETTING NAME |
|---|---|---|---|---|
| 1 | PA1 | PB1 | PC1 | ..._50mmF1.8 |
| 2 | PA2 | PB2 | PC2 | ..._35mmF1.4 |
| · | · | · | · | · |
| · | · | · | · | · |
| · | · | · | · | · |

CAMERA BODY, MOUNT ADAPTER, AND METHODS OF CONTROLLING OPERATION OF SAME

CROSS-REFERENCE TO RELATED APPLICATIONS

This application is a Continuation of PCT International Application No. PCT JP2013/083835 filed on Dec. 18, 2013, which claims priority under 35 U.S.C. §119(a) to Japanese Patent Application No. 2013-057669 filed Mar. 21, 2013. Each of the above application(s) is hereby expressly incorporated by reference, in its entirety, into the present application.

BACKGROUND OF THE INVENTION

1. Field of the Invention

This invention relates to a camera body and mount adapter as well as methods of controlling operation of the camera body and mount adapter.

2. Description of the Related Art

Utilizing a mount adapter makes it possible for another mount lens to be mounted on a non-reflex camera. When another mount lens is mounted, there are instances where the camera cannot receive lens information because of a mismatch between the communication standards of the camera and lens. As a consequence, there are cases where the camera cannot control the lens appropriately or where a captured image correction conforming to the lens cannot be performed. Further, there is an arrangement in which the user inputs some lens information to a camera manually to perform operations such as lens control or correction of captured images.

Furthermore, there is a system in which an adapter, which incorporates a conversion lens and performs AF (autofocus) by driving this internal lens, has an AF/MF switch (Patent Document 1); an adapter that adapts a lens to a camera acting as a slave (Patent Document 2); and a system in which a conversion path is connected between a camera and a lens only if a conversion is necessary for the information between the camera and the lens, with the camera and the lens being connected directly when a conversion is not necessary.

Patent Document 1: Japanese Patent Application Laid-Open No. 1-248115

Patent Document 2: Japanese Patent Application Laid-Open No. 11-344756

Patent Document 3: Japanese Patent Application Laid-Open No. 2012-037692

In a case where a user inputs some lens information to a camera manually, this operation can become troublesome when using multiple lenses interchangeably. Further, Patent Documents 1 to 3 do not take into consideration the correcting of captured images in accordance with a lens mounted via a mount adapter.

SUMMARY OF THE INVENTION

An object of the present invention is to arrange it so that a captured image can be corrected comparatively easily in accordance with a lens mounted via a mount adapter.

A camera body according to a first aspect of the present invention comprises: a switch setting state detection device (switch setting state detection means) for detecting setting state of a setting switch provided on a circumferential surface of a mount adapter mounted between a camera body and an interchangeable lens; a correction parameter memory for storing correction parameters, which correct a captured image, in accordance with states settable by the setting switch; a correction parameter readout device (correction parameter reading means) for reading out correction parameters, which correspond to the state of the setting switch detected by the switch setting state detection device, from the correction parameter memory; and an image correction device (image correction means) for correcting the captured image using the correction parameters read out by the correction parameter reading device.

The first aspect of the present invention also provides a method of controlling operation of a camera body. Specifically, the method comprises steps of: detecting setting state of a setting switch provided on a circumferential surface of a mount adapter mounted between a camera body and an interchangeable lens; reading correction parameters, which correct a captured image, from a correction parameter memory that stores correction parameters in accordance with states settable by the setting switch, the read correction parameters corresponding to the detected state of the setting switch; and correcting the captured image using the read correction parameters.

In accordance with the first aspect of the present invention, an interchangeable lens is mounted on a camera body via a mount adapter. The circumferential surface of the mount adapter is provided with a setting switch (the switch is not limited to a mechanical switch and may be a software-utilizing switch such as a touch switch having a touch-sensitive panel formed on a screen). Correction parameters for correcting a captured image have been stored in a camera body in correspondence with states settable by the setting switch. When the setting state of the setting switch provided on the mount adapter is detected, correction parameters corresponding to the detected setting state are read out. The captured image is corrected using the read correction parameters. Thus, even if an interchangeable lens that cannot communicate with the camera body directly has been mounted via the mount adapter, a captured image can be corrected in accordance with the characteristics of the interchangeable lens.

The camera body may further comprise a display unit for displaying on a display screen the setting state of the setting switch detected by the switch setting state detection device.

The camera body may further comprise a switch setting state change detection device (switch setting state change detection means) for detecting whether the setting state of the setting switch has been changed. In this case, the display unit would display on the display screen the state of the setting switch detected by the switch state detection device in accordance with detection, by the switch setting state change detection device, of a change in the setting state of the setting switch, as well as the fact that the setting state of the setting switch has changed.

The camera body may further comprise a display control device (display control means) for controlling the display unit in such a manner that a live-view image obtained by pre-imaging is displayed on the display screen. In this case, the switch setting state change detection device would detect, in response to display of the live-view image on the display screen by control exercised by the display control device, whether the setting state of the setting switch has changed.

The switch setting state detection device detects the setting state of the setting switch in response to turn-on of a power supply of the camera body, by way of example.

The camera body may further comprise a mount adapter mounting detection device (mount adapter mounting detection means) for detecting that the mount adapter has been mounted on the camera body. In this case the switch setting state detection device would detect the setting state of the setting switch in response to detection, by the mount adapter mounting detection device, of mounting of the mount adapter on the camera body.

The camera body may further comprise an interchangeable lens mounting detection device (interchangeable lens mounting detection means) for detecting that an interchangeable lens has been mounted on the mount adapter mounted on the camera body. In this case, the switch setting state detection device would detect the setting state of the setting switch in response to detection, by the interchangeable lens mounting detection device, of mounting of the interchangeable lens on the mount adapter.

A second aspect of the present invention provides a mount adapter mounted between a camera body and an interchangeable lens, comprising: a setting switch provided on a circumferential surface of the mount adapter; and a setting state data transmitting device (setting state data transmitting means) for transmitting data, which represents the setting state of the setting switch, to the camera body.

The second aspect of the present invention also provides a method of controlling operation of a mount adapter. Specifically, the second aspect of the present invention provides a method of controlling operation of a mount adapter mounted between a camera body and an interchangeable lens, the method comprising steps of: providing a setting switch on a circumferential surface of the mount adapter; receiving setting state request data, which requests the setting state of the setting switch, transmitted from the camera body; and transmitting data, which represents the setting state of the setting switch, to the camera body in response to receipt of the setting state request data.

In accordance with the second aspect of the present invention, a setting switch is provided on the circumferential surface of a mount adapter, and data representing the setting state of the setting switch is sent to a camera body. As described, correction parameters conforming to the setting state are read out in the camera body and a captured image is corrected.

The mount adapter may further comprise a setting state request data receiving device (setting state request data receiving means) for receiving setting state request data transmitted from the camera body. In this case, the setting state data transmitting device would transmit data, which represents the setting state of the setting switch, to the camera body in response to receipt of the setting state request data by the setting state request data receiving device.

The mount adapter may further comprise: a mount adapter memory for storing data indicative of this mount adapter; and a mount adapter data transmitting device (mount adapter data transmitting means) for sending the camera body the data, which is indicative of the mount adapter, stored in the mount adapter memory.

The mount adapter may further comprise a type request data receiving device (type request receiving means) for receiving type request data transmitted from the camera body. In this case, the mount adapter data transmitting device would, in response to receipt of the type request data received by the type request data transmitting device, send the camera body the data, which is indicative of the mount adapter, stored in the mount adapter memory.

The setting switch is, for example, a slide switch. In this case, the slide switch would include: a knob member freely slidable along the circumferential surface of the mount adapter and formed to have a projection penetrating into the interior of the mount adapter; a positioning member formed to have recesses conforming to direction of movement of the knob member, the recesses corresponding to the number of states settable by the setting switch; a biasing mechanism for biasing the positioning member toward an inner circumferential surface of the mount adapter; and an engaging mechanism for engaging with the interchangeable lens as a result of the interchangeable lens having been mounted on the mount adapter, and when the interchangeable lens is removed from the mount adapter, for disengaging from the interchangeable lens and disengaging the projection of the knob member from a recess of the positioning member against biasing of the positioning member by the biasing mechanism.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is an example of a correction parameter table;

DESCRIPTION OF THE PREFERRED EMBODIMENTS

Figure 1:
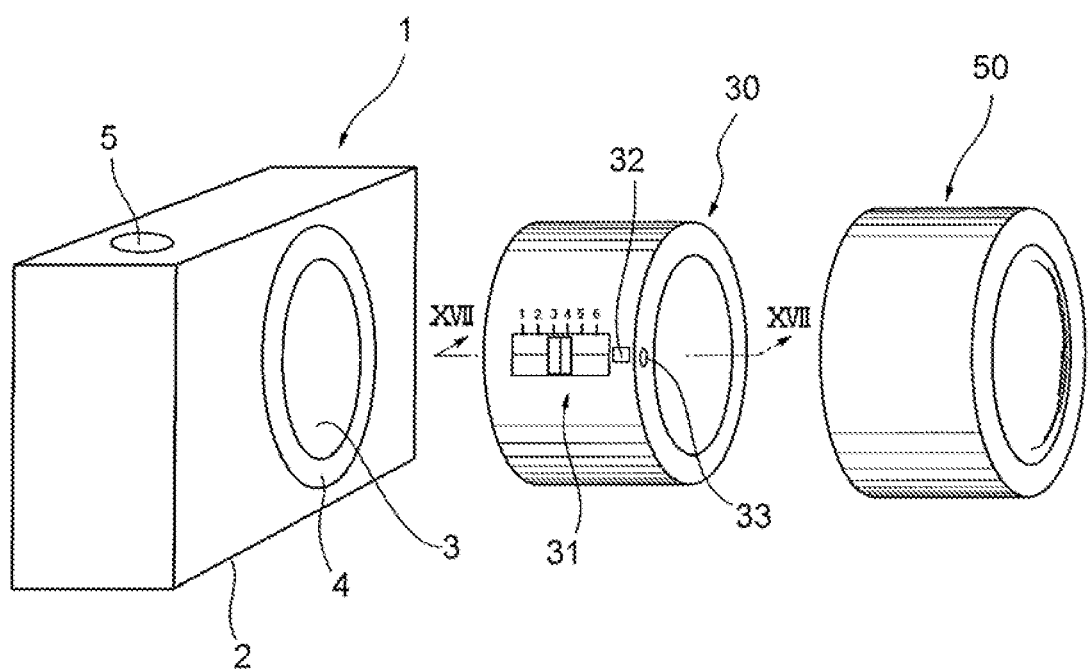
FIG. 1 is a perspective view of a camera body, mount adapter and interchangeable lens.

FIG. 1, which illustrates an embodiment of the present invention, is a perspective view of a camera body 1, a mount adapter 30 and an interchangeable lens 50.

The camera body 1 is of the nonreflex-type the lens of which can be interchanged. An opening 3 is formed in the front side (the right side in FIG. 1) of the camera body 1 approximately at the center thereof. The periphery of the opening 3 is formed to have a mount 4 in which the mount adapter 30 is to be mounted.

The top side of the camera body 1 is provided with a shutter-release button 5.

The mount adapter 30, which is annular in shape, is formed to have mounts 44 and 45 at respective ones of both ends thereof. The first mount 44, which is on the left side in FIG. 1, will be attached to the camera body 1, and the second mount 45, which is on the right side in FIG. 1, will be attached to the interchangeable lens 50.

A slide switch 31, which is freely slidable along the optical axis, is formed on the circumferential surface of the mount adapter 30. Numerals 1 to 6 are written along the upper side of the slide switch 31. The slide switch 31 can be positioned at the positions indicated by these numerals. A lens mounting/demounting button 32 capable of being pressed in the radial direction is formed on the right side of the slide switch 31 in FIG. 1. An insertion hole 33 extending laterally of the lens mounting/demounting button 32 is formed in the mount 45. As will be described later in greater detail, an engaging pin projects from the insertion hole 33 in freely back-and-forth fashion whereby the mount adapter 30 and interchangeable lens 50 are removably attached to each other. It should be noted that in order to prevent the slide switch 31 from being contacted by the finger of the user, which may cause erroneous operation when shooting, it is desired that the slide switch 31 be formed on the circumferential surface of the mount adapter 30 on the side that will be the upper side when the mount adapter 30 is mounted on the camera body 1.

Figure 2:
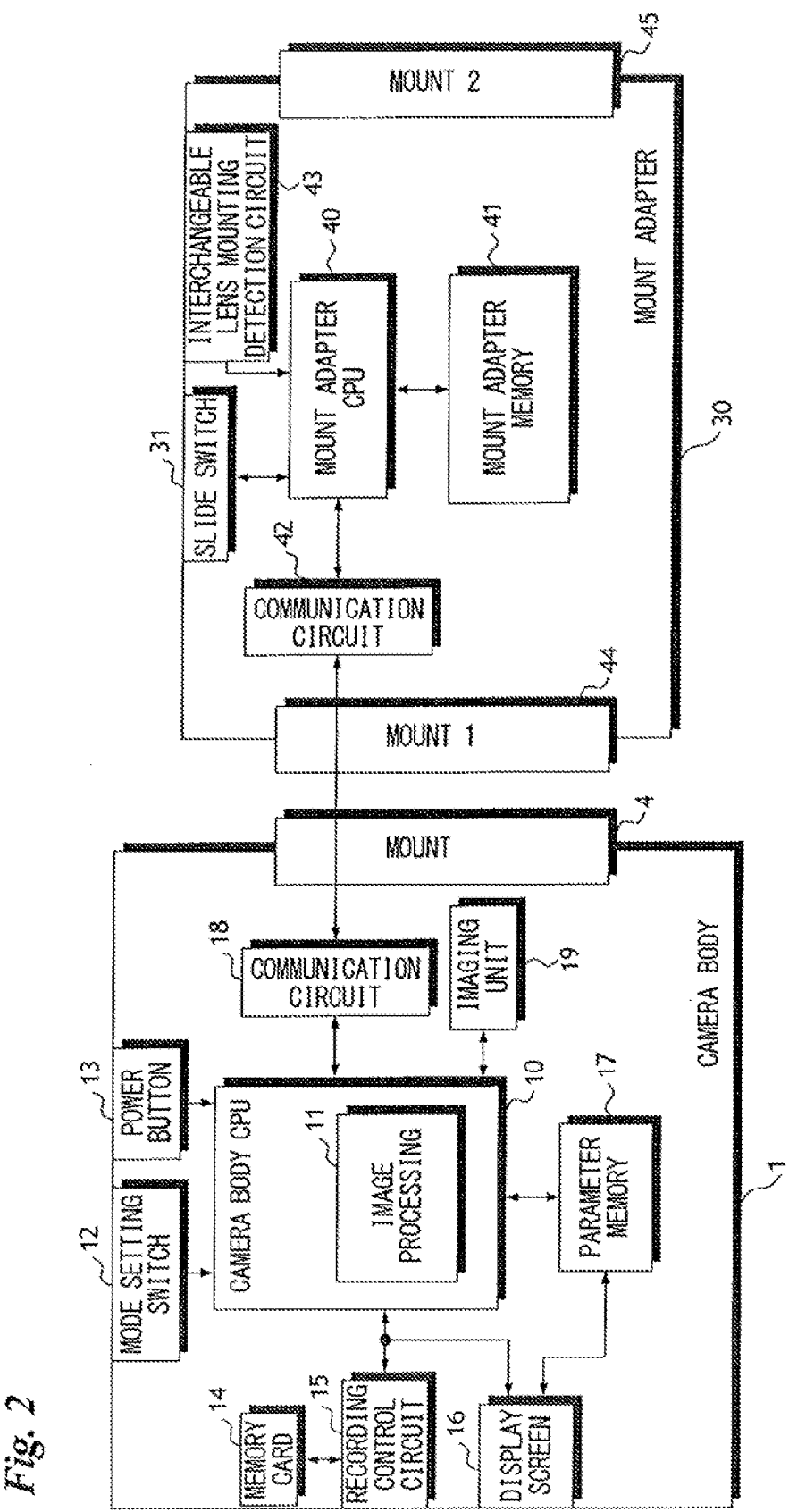
FIG. 2 is a block diagram illustrating the electrical configurations of the camera body and mount adapter.

FIG. 2 is a block diagram illustrating the electrical configurations of the camera body 1 and mount adapter 30.

The overall operation of the camera body 1 is controlled by a camera body CPU 10.

The camera body CPU 10 has an image processing function 11 for correcting an image obtained by imaging. The camera body 1 also includes a parameter memory 17 in which correction parameters have been stored. Correction parameters conforming to the setting state of the slide switch 31 of the mount adapter 30 are read out of the parameter memory 17. The captured image is corrected using the correction parameters read out. Further, the correction parameters read out are applied to and displayed on a display unit 16.

The camera body 1 is provided with a mode setting switch 12, which is for setting modes such as an imaging mode and a playback mode, a power button 13, etc., in addition to the shutter-release button 5 described above. Output signals from the mode setting switch 12 and power button 13 are input to the camera body CPU 10.

The camera body 1 also includes an imaging unit 19 for imaging a subject. Image data output from the imaging unit 19 representing the image of the subject is input to the camera body CPU 10, whereby the image data is subjected to image correction processing. The image data that has undergone image correction is recorded on a memory card 14 by a recording control circuit 15. The camera body 1 further includes a communication circuit 18 for communicating with the mount adapter 30.

The overall operation of the mount adapter 30 is controlled by a mount adapter CPU 40.

A signal indicating the position of the slide switch 31 formed on the circumferential surface of the mount adapter 30 as described above is input to the mount adapter CPU 40. The mount adapter 30 also includes a mount adapter memory 41 for storing data indicative of this mount adapter. The mount adapter 30 further includes a communication circuit 42 for communicating with the camera body 1, and an interchangeable lens mounting detection circuit 43 for detecting that the interchangeable lens 50 has been mounted on the mount adapter 30.

FIG. 3 is an example of the correction parameter table stored in the parameter memory 17 of the camera body 1.

The correction parameter memory stores correction parameters for correcting images, as mentioned above. Correction parameters are stored in correspondence with the setting states of the slide switch 31 of the mount adapter 30. The correction parameters are a distortion aberration correction parameter, a color shading correction parameter and a peripheral light quantity correction parameter. Also stored in the correction parameter table are interchangeable-lens setting names that correspond to the switch setting states set by the slide switch 31. If an interchangeable lens having such a setting name has been mounted on the mount adapter 30, the user moves the slide switch 31 in such a manner that the switch setting state will be the setting state that corresponds to this setting name. It goes without saying that the user is aware of the correspondence between the interchangeable lens 50 and the switch setting state. When the setting state of the slide switch 31 is detected, the correction parameters corresponding to this detected setting state are read out of the parameter memory 17, as described above. An image correction is performed using the correction parameters read out.

Figure 4:
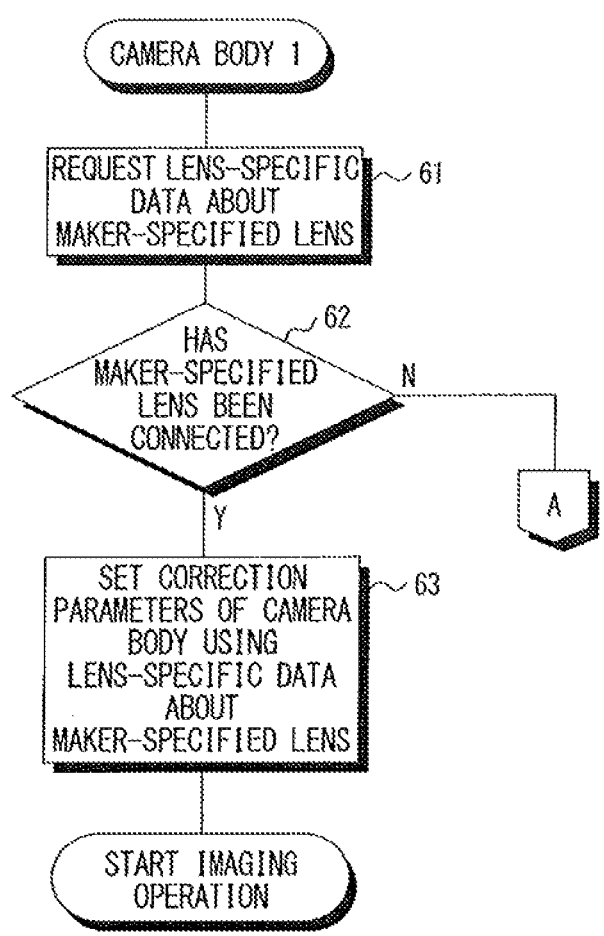
FIGS. 4 and 5 are flowcharts illustrating processing executed by the camera body.
Figure 5:
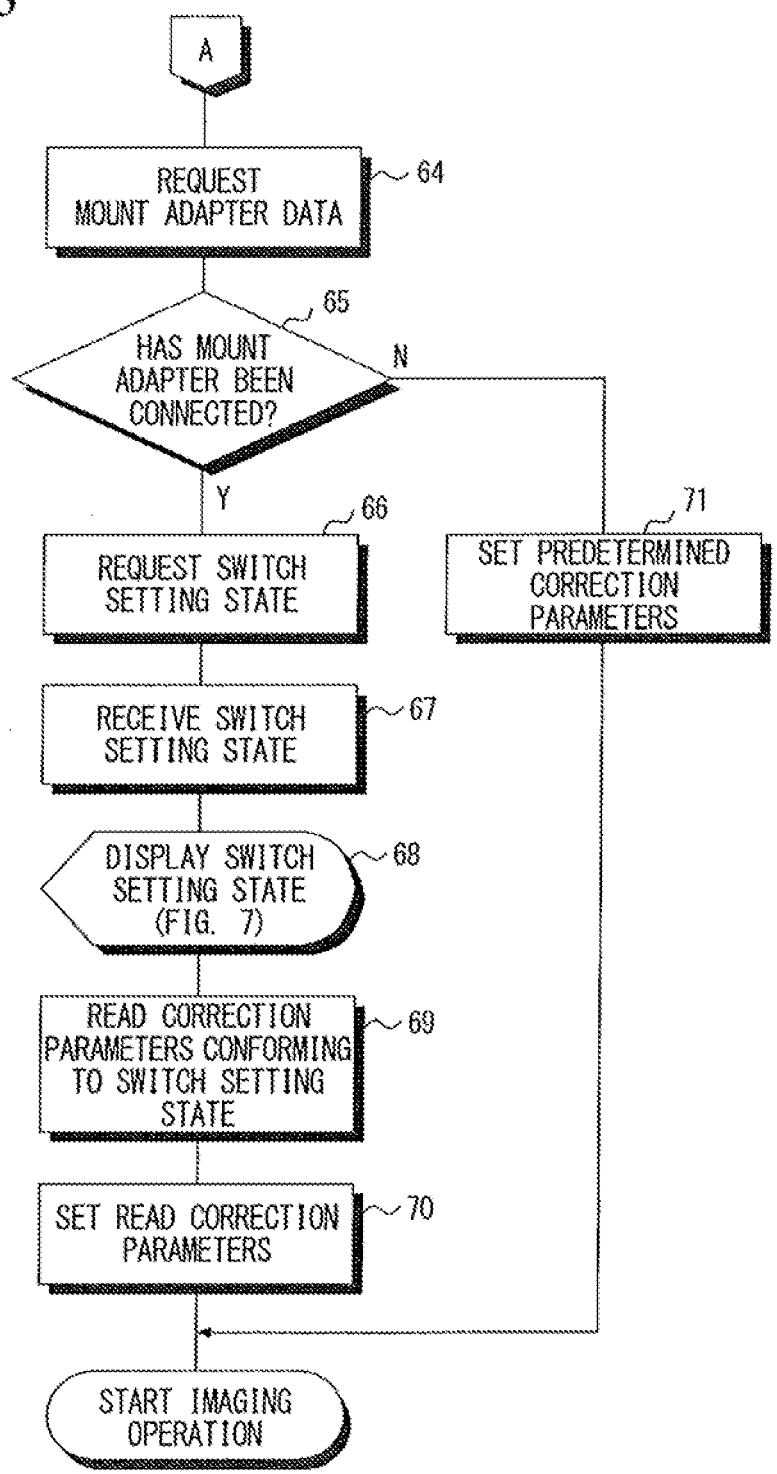
Figure 6:
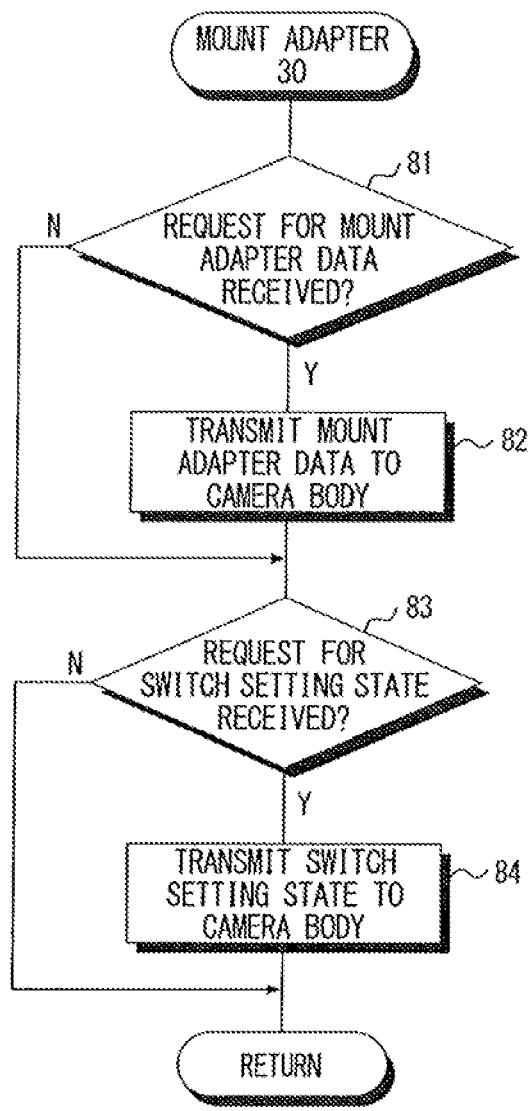
FIG. 6 is a flowchart illustrating processing executed by the mount adapter.

FIGS. 4 and 5 are flowcharts illustrating processing executed by the camera body 1, and FIG. 6 is a flowchart illustrating processing executed by the mount adapter 30. These processing procedures display the setting state of the slide switch 31, which is provided on the mount adapter 30, on the display screen of the display unit 16 of the camera body 1.

First, a command requesting lens-specific data concerning a maker-specified lens is transmitted from the camera body 1 (step 61 in FIG. 4). If a maker-specified lens for the camera body 1 has been mounted on the camera body 1, then, in response to the command sent from the camera body 1, the maker-specified lens transmits the maker-specified lens-specific data to the camera body 1. When the lens-specific data is received by the camera body 1, the camera body CPU 10 of the camera body 1 determines that a maker-specified lens has been connected ("YES" at step 62 in FIG. 4). The correction parameters of the camera body 1 are set using the lens-specific data regarding the maker-specified lens (step 63 in FIG. 4).

If maker-specified lens-specific data is not transmitted from the maker-specified lens in response to the command sent from the camera body 1, it is determined that a maker-specified lens has not been connected to the camera body 1 ("NO" at step 62). The camera body 1 then transmits a command requesting mount adapter data (step 64 in FIG. 5).

If the mount adapter 30 has been mounted on the camera body 1, the command requesting mount adapter data sent from the camera body 1 will be received by the mount adapter 30 ("YES" at step 81 in FIG. 6), whereupon mount adapter data (data indicative of the mount adapter 30) that has been stored in the mount adapter memory 41 is read out, and the read mount adapter data is transmitted from the mount adapter 30 to the camera body 1 (step 82 in FIG. 6).

If the mount adapter data is not received by the camera body 1 ("NO" at step 65 in FIG. 5), it is determined that neither the mount adapter 30 nor a maker-specified lens has been mounted on the camera body 1. In such case the camera body 1 is not able to determine what kind of lens has been mounted and, hence, predetermined correction parameters are set (step 71 in FIG. 5).

If mount adapter data is received by the camera body 1, it is determined that the mount adapter 30 has been mounted on the camera body 1 ("YES" at step 65 in FIG. 5). A command requesting the switch setting state is then transmitted from the camera body 1 (step 66 in FIG. 5).

If the command requesting the switch setting state sent from the camera body 1 is received by the mount adapter 30 ("YES" at step 83 in FIG. 6), the setting state of the slide switch 31 is detected. Data representing the switch setting state detected is transmitted from the mount adapter 30 to the camera body 1 (step 84 in FIG. 6).

When the data representing the switch setting state sent from the mount adapter 30 is received by the camera body 1 (step 67 in FIG. 5), the setting state of the slide switch 31 is displayed on the display screen of the display unit 16 of the camera body 1 (step 68 in FIG. 5).

Figure 7:
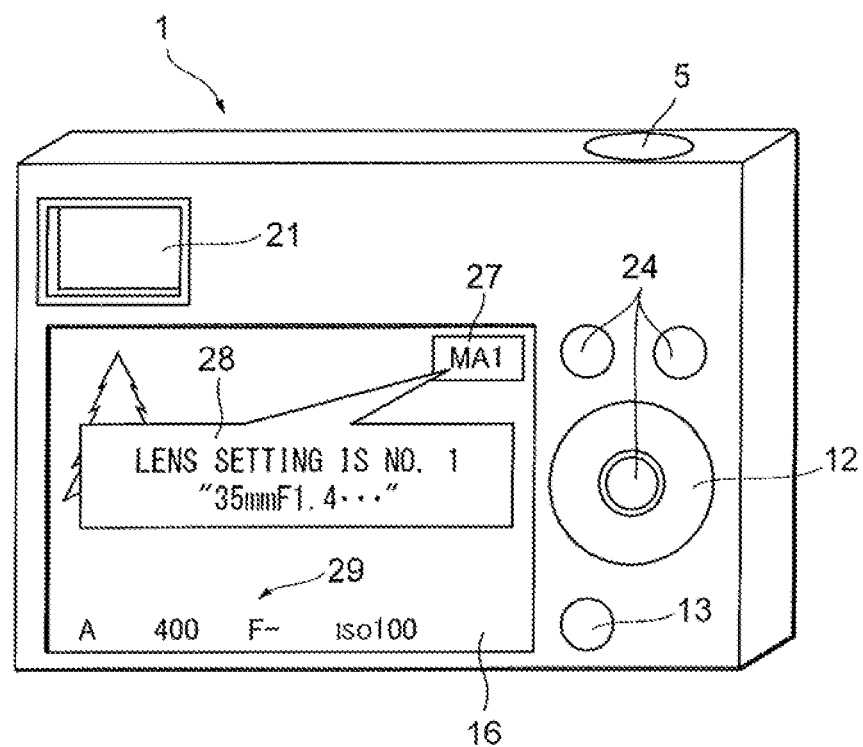
FIG. 7 is a back view of the camera body.

FIG. 7 is a back view of the camera body 1.

A display screen 16 (the reference numerals are the same as those of the display unit) is formed substantially over the entirety of the back face of the camera body 1. An optical viewfinder 21 is formed at the upper left of the display screen 16. The above-mentioned mode setting switch 12, power button 13 and other buttons 24 are formed on the right side of the display screen 16.

A switch setting state display area 27 is formed at the upper right of the display screen 16. The setting state of the slide switch 31 represented by the switch setting state data is displayed in the area 27. The switch setting state is represented by a numeral that follows MA (mount adapter). The numeral indicates the setting state of the slide switch 31. If the position of the slide switch 31 is 1, 2, 3, 4, 5 or 6, then the numeral displayed following MA in the switch setting state display area 27 will be 1, 2, 3, 4, 5 or 6. The display screen 16 further includes a lens characteristic display area 28 that displays the characteristics of the interchangeable lens 50 indicated by the setting state of the slide switch 31. Included at the lower portion of the display screen 16 is an information display area 29 indicating ISO sensitivity and the like.

Since the setting state of the slide switch 31 of the mount adapter 30 is displayed on the display screen 16, the user can check the setting state of the slide switch 31 comparatively simply.

With reference to FIG. 5, correction parameters conforming to the switch setting state of the slide switch 31 are read from the correction parameter table (see FIG. 3), which has been stored in the parameter memory 17, when the switch setting state is displayed on the display screen 16 (step 69 in FIG. 5). The read correction parameters are set in the camera body 1 (the image processing function 11) (step 70 in FIG. 5). Thereafter, the subject is imaged and the image obtained by imaging is corrected using the set correction parameters. The image data representing the corrected image is recorded on the memory card 14.

Even if the interchangeable lens 50 is not the maker-specified lens of the camera body 1, an image correction conforming to the characteristics of the interchangeable lens 50 can be achieved.

FIGS. 8 to 11 illustrate another embodiment. In this embodiment, the setting state of the slide switch 31 of the mount adapter 30 is displayed on the display screen 16 in response to setting of the imaging mode and display of a live-view image on the display screen 16 by pre-imaging.

Assume that the mount adapter 30 has been mounted on the camera body 1. When the imaging mode is set by the mode setting switch 12, the subject is imaged (step 91 in FIG. 8) and a live-view image representing the image of the subject is displayed on the display screen 16 (step 92 in FIG. 8). The switch setting state of the slide switch 31 is detected in the mount adapter 30 and data indicating the detected switch setting state is transmitted from the mount adapter 30 to the camera body 1.

Figure 10:
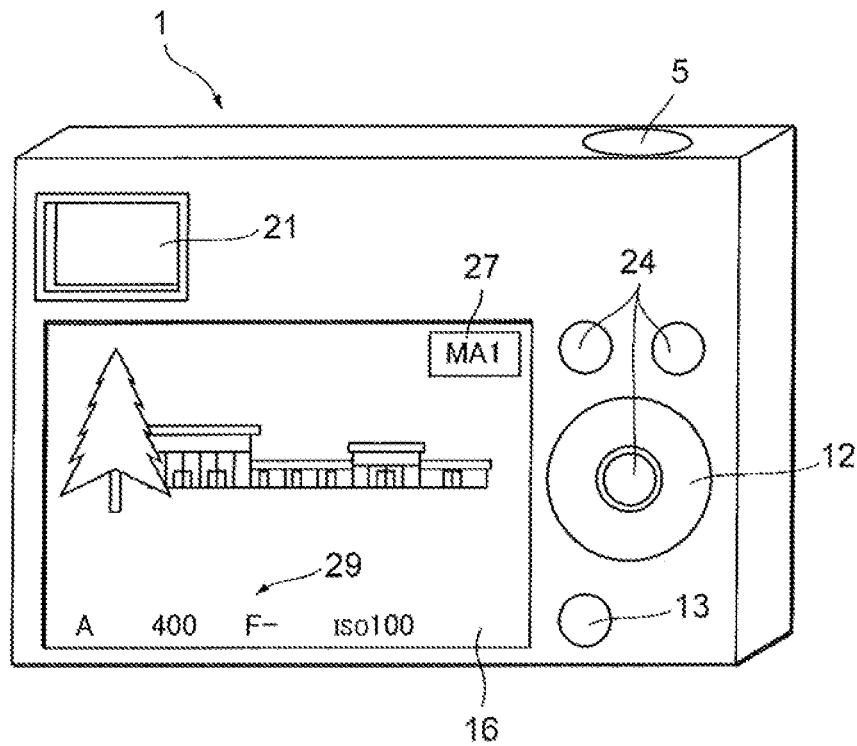
FIGS. 10 and 11 are rear views of the camera body.

FIG. 10 is an example of a back view of the camera body 1. Items in FIG. 10 identical with those shown in FIG. 7 are designated by like reference characters and need not be described again.

When the imaging mode is set and the subject image is imaged, the live-view image of the subject is displayed on the display screen 16, as described above. Further, the switch setting state of the slide switch 31 is displayed on the area 17 based upon the data indicating the switch setting state transmitted from the mount adapter 30, as described above.

Figure 9:
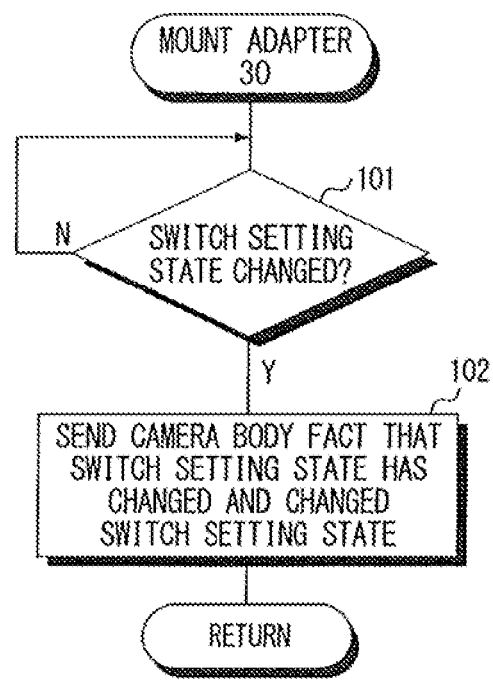
FIG. 9 is a flowchart illustrating processing executed by the mount adapter.

If the switch setting state of the slide switch 31 of the mount adapter 30 is changed with the live-view screen being displayed ("YES" at step 101 in FIG. 9), data indicating the fact that the switch setting state has been changed and data representing the changed switch setting state is transmitted from the mount adapter 30 to the camera body 1 (step 102 in FIG. 9). It may be arranged so that in response to the display of the live-view image on the display screen 16 of the camera body 1, a command indicating a request for the switch setting state is transmitted from the camera body 1 to the mount adapter 30 and, in response to this command, data indicating the fact that the switch setting state has been changed and data representing the changed switch setting state is transmitted from the mount adapter 30 to the camera body 1.

Figure 8:
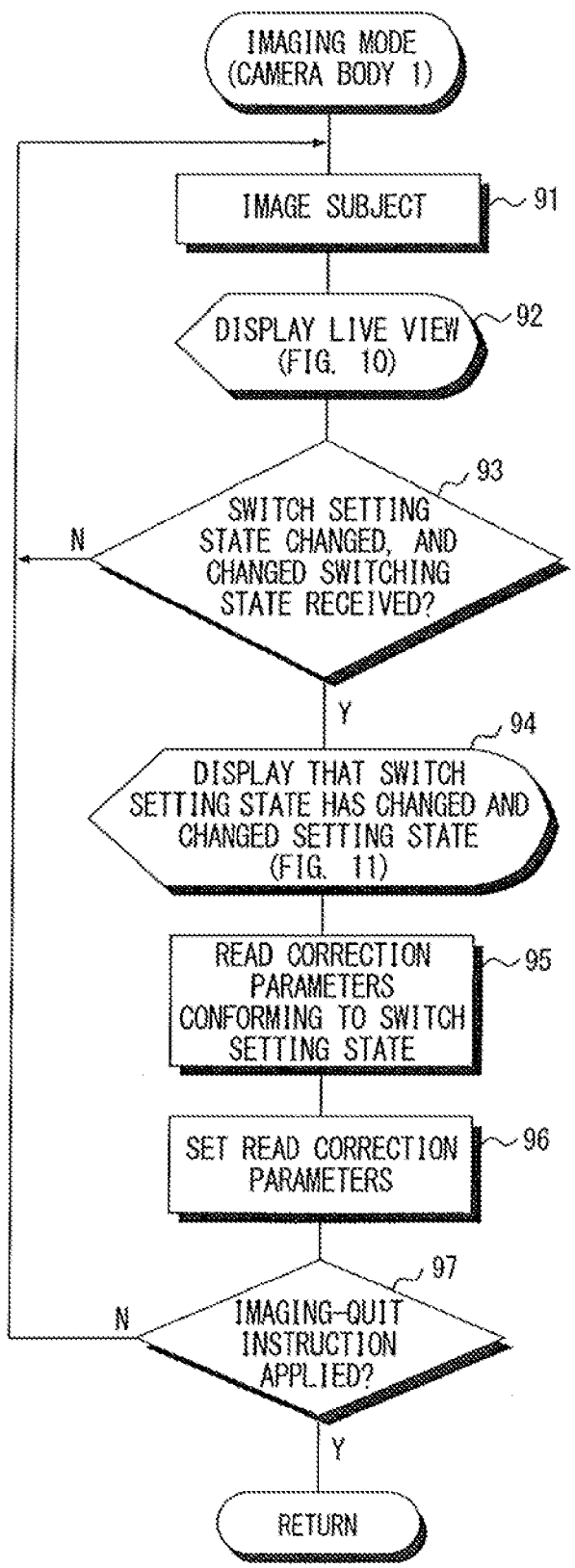
FIG. 8 is a flowchart illustrating processing executed by the camera body.

If data indicating the fact that the switch setting state has been changed and data representing the changed switch setting state transmitted from the mount adapter 30 is received by the camera body 1 ("YES" at step 93 in FIG. 8), the fact that the switch state has been changed and the changed switch state are displayed on the display screen 16 (step 94 in FIG. 8).

Figure 11:
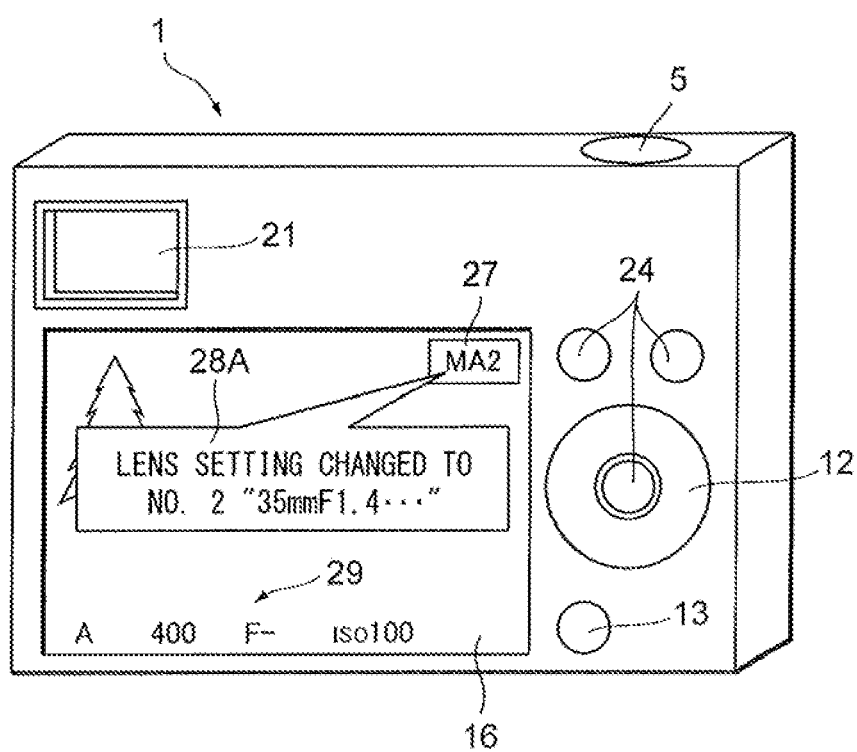

FIG. 11 is an example of a back view of the camera body 1. Items in FIG. 11 identical with those shown in FIG. 7 are designated by like reference characters and need not be described again.

An area 28A is displayed on the display screen 16, as described above, and lens information obtained after a change is displayed in the area 28A so as to indicate the fact that the switch setting state of the slide switch 31 has been changed. Further, the changed switch setting state is displayed in the area 17. It may of course be arranged so that the switch setting state that prevailed before the change is displayed in the area 17. Since the area 28A will interfere with the deciding of the camera angle, it is preferred that the display presented by the area 28A last for only a fixed period of time and then vanish at expiration of the fixed period of time.

Thereafter, correction parameters conforming to the switch setting state of the slide switch 31 are read from the parameter memory 17 (step 95 in FIG. 8) and the read correction parameters are set in the camera body 1 (step 96 in FIG. 8). The processing from step 91 to step 96 is repeated until an imaging-quit instruction is applied (step 97). If an operation such as depression of the shutter-release button 5 is performed, the image data obtained by imaging is recorded on the memory card 14.

Thus, this embodiment prevents an image correction from being carried out using correction parameters not suitable for the interchangeable lens 50 as a result of the user changing over the slide switch 31 unintentionally during imaging and then shooting without noticing the switch changeover.

Figure 12:
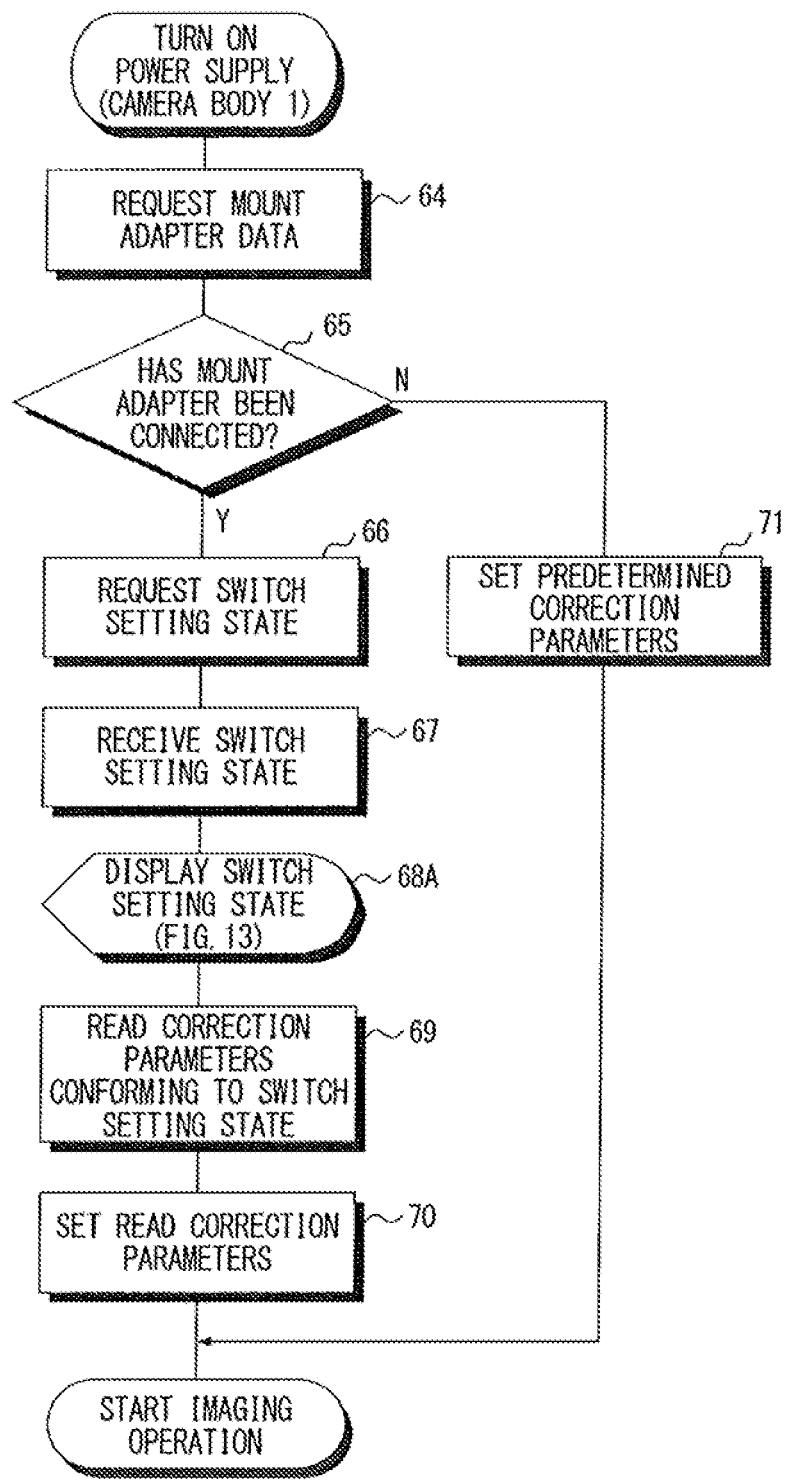
FIG. 12 is a flowchart illustrating processing executed by the camera body.
Figure 13:
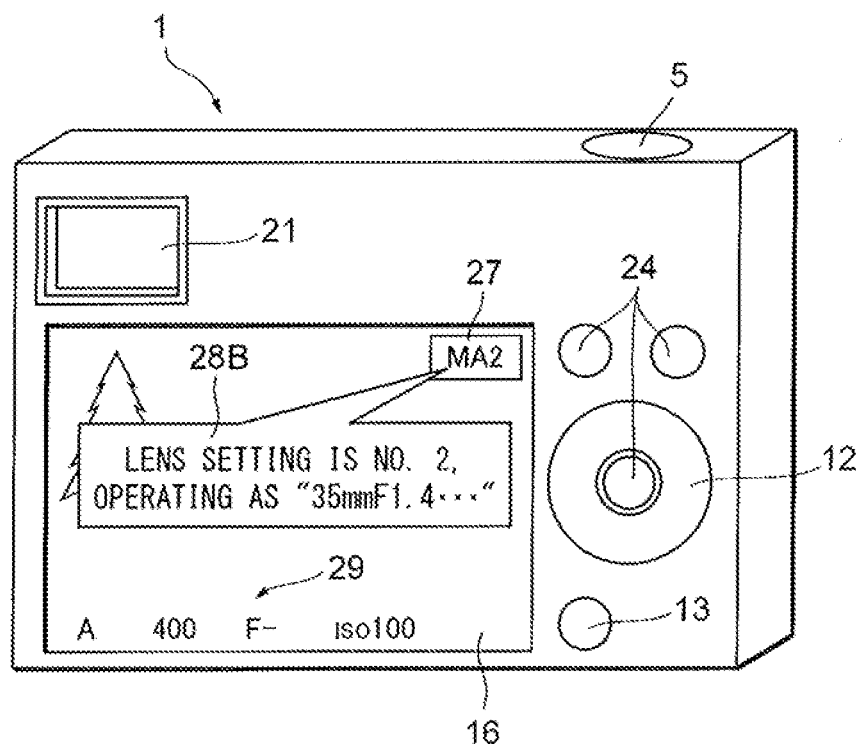
FIG. 13 is a rear view of the camera body.

FIGS. 12 and 13 illustrate another embodiment. This embodiment is such that, in a case where the power supply of the camera body 1 is switched from off to on, the user is notified of the state of the slide switch 31 of the mount adapter 30.

FIG. 12, which illustrates processing executed by the camera body 1, is started by pressing the power button 13. Processing steps in FIG. 12 identical with those shown in FIG. 5 are designated by like step numbers.

When the power button 13 of the camera body 1 is pressed, the camera body 1 requests the mount adapter 30 for mount adapter data (step 64). When the mount adapter data sent from the mount adapter 30 is received, it is determined that the mount adapter 30 has been connected to the camera body 1 ("YES" at step 65). A command requesting the switch setting state is then transmitted from the camera body 1 to the mount adapter 30 (step 66). When the data representing the switch setting state sent from the mount adapter 30 is received by the camera body 1 (step 67), the setting state of the slide switch 31 is displayed on the display screen 16 of the camera body 1 (step 68A)

FIG. 13 is an example of a back view of the camera body 1. Items in FIG. 13 identical with those shown in FIG. 7 are designated by like reference characters and need not be described again.

The switch setting state of the slide switch 31 is displayed in the area 17 of the display screen 16. Further, an area 28B, which displays lens information specified by the switch setting state, is displayed on the display screen 16.

Thereafter, correction parameters conforming to the switch setting state of the slide switch 31 are read from the parameter memory 17 (step 69) and the read correction parameters are set in the camera body 1 (step 70).

Even in a case where the slide switch 31 of the mount adapter 30 has been moved accidentally with the power supply of the camera body 1 in the OFF state, the user is notified of the present switch setting state. This prevents the user from shooting without noticing that there has been a shift in the switch state of the slide switch 31.

Figure 14:
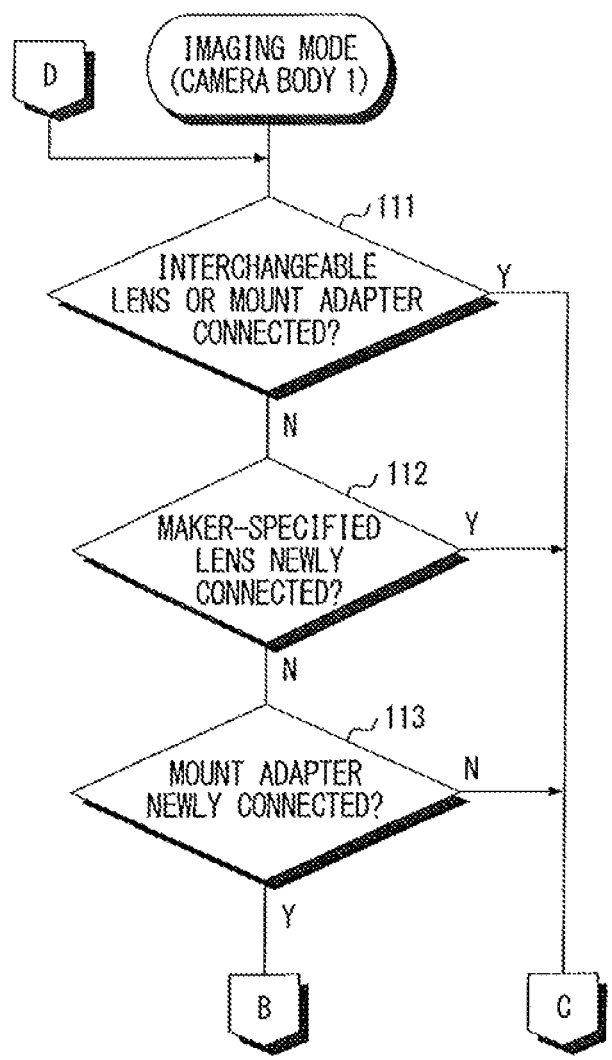
FIGS. 14 to 16 are flowcharts illustrating processing executed by the camera body.
Figure 15:
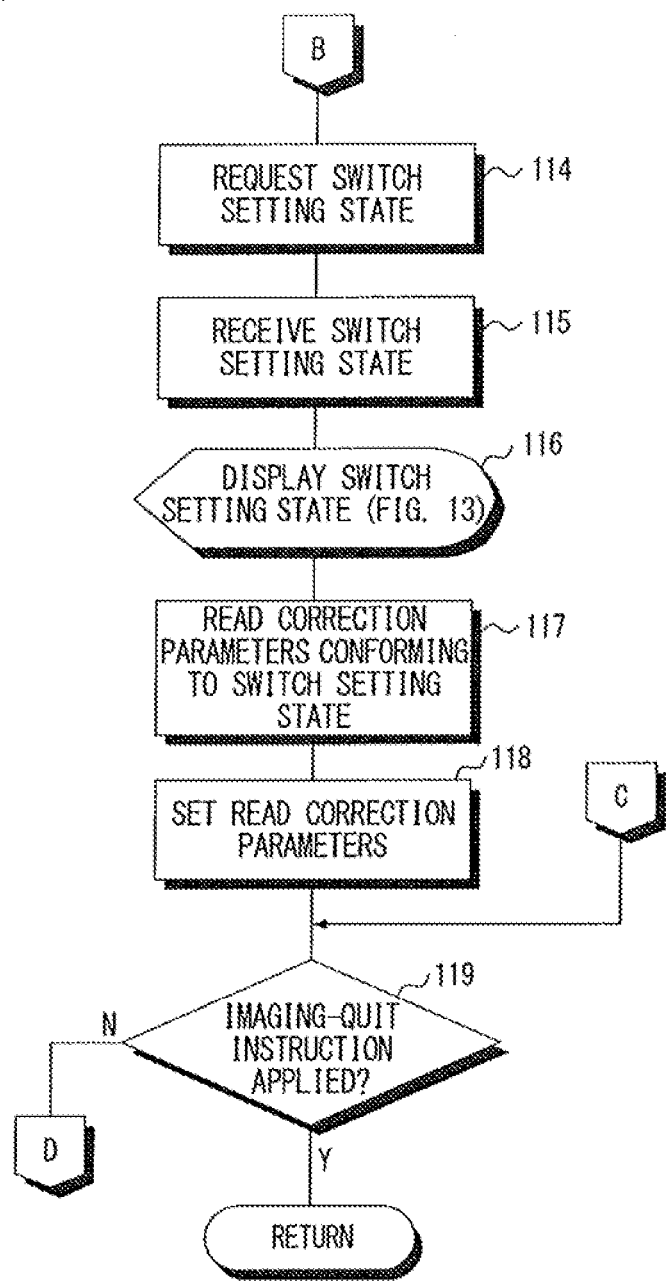

FIGS. 14 and 15, which illustrate a further embodiment, are flowcharts showing processing executed by the camera body 1.

This embodiment mainly notifies the user of the switch setting state of the slide switch 31 in a case where the mount adapter 30 has been mounted.

Assume that the camera body 1 has been set to the imaging mode.

First, it is determined whether the interchangeable lens 50 or the mount adapter 30 has been mounted on the camera body 1 (step 111 in FIG. 14). As described above, if a command requesting mount adapter data is transmitted from the camera body 1 and, in response to this command, the mount adapter data is transmitted from the mount adapter 30, it can be ascertained that the mount adapter 30 has been mounted on the camera body 1. If a command requesting lens-specific data regarding a maker-specified lens is transmitted from the camera body 1 and, in response to this command, the lens-specific data regarding the maker-specified lens is transmitted from the lens, it can be ascertained that a maker-specified lens has been mounted on the camera body 1.

If neither the interchangeable lens 50 nor the mount adapter 30 has been mounted on the camera body 1 ("NO" at step 111 in FIG. 14), it is determined whether a maker-specified lens has been newly mounted on the camera body 1 (step 112 in FIG. 14). If the command requesting lens-specific data regarding a maker-specified lens is transmitted from the camera body 1 and, in response to this command, the lens-specific data regarding the maker-specified lens is transmitted from the lens, it can be ascertained that a maker-specified lens has been mounted on the camera body 1, as set forth above.

If a maker-specified lens has not been newly mounted on the camera body 1 ("NO" at step 112 in FIG. 14), it is determined whether the mount adapter 30 has been newly mounted on the camera body 1 (step 113 in FIG. 14). If the command requesting mount adapter data is transmitted from the camera body 1 and, in response to this command, the mount adapter data is transmitted from the mount adapter 30, as described above, it can be ascertained that the mount adapter 30 has been newly mounted on the camera body 1.

If it is ascertained that the mount adapter 30 has been newly mounted on the camera body 1 ("YES" at step 113 in FIG. 14), a command requesting the switch setting state is transmitted from the camera body 1 to the mount adapter 30 (step 114 in FIG. 15), as described above. Data indicating the switch setting state is transmitted from the mount adapter 30 in response to transmission of the command and the data is received by the camera body 1 (step 115 in FIG. 15), whereupon the switch setting state of the slide switch 31 of the mount adapter 30 is displayed on the display screen 16, as shown in FIG. 13. Thereafter, correction parameters conforming to the switch setting state of the slide switch 31 are read from the parameter memory 17 (step 117 in FIG. 15) and the read correction parameters are set in the camera body 1 (step 118 in FIG. 15).

If there is no imaging-quit instruction ("NO" at step 119), processing is repeated from step 111 onward in FIG. 14.

Even in a case where the setting of the slide switch 31 is changed by operational error during the time that the mount adapter 30 is not mounted on the camera body 1 or when the mount adapter 30 is mounted on or demounted from the camera body 1, the user can tell that the setting has been changed. This prevents the user from shooting without noticing that there has been a change in the setting of the slide switch 31.

Figure 16:
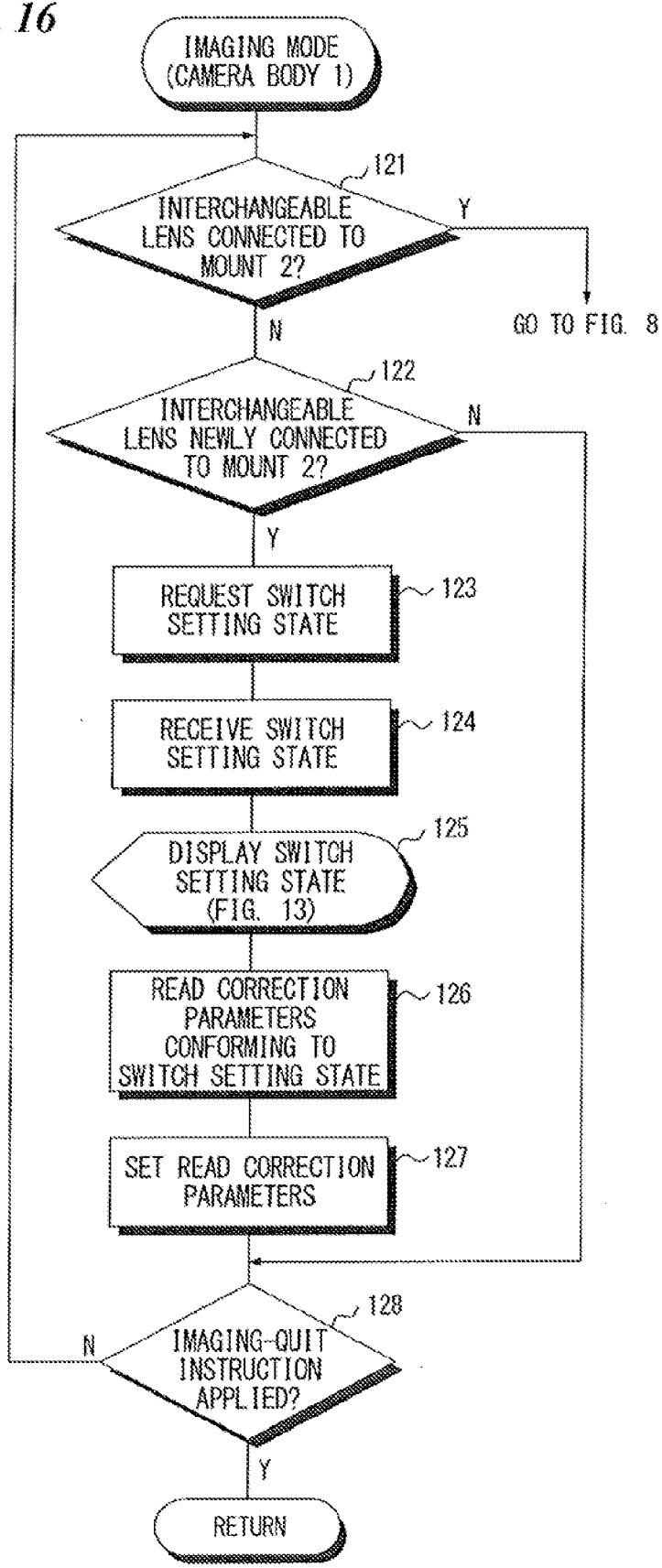

FIG. 16, which illustrates a further embodiment, is a flowchart showing processing executed by the camera body 1.

Mainly, this is processing for a case where the mount adapter 30 has been mounted on the camera body 1 but there is a change from a state in which the interchangeable lens 50 has not been mounted on the mount adapter 30 to a state in which the interchangeable lens 50 has been mounted on the mount adapter 30 anew. Assume that the mount adapter 30 has been mounted on the camera body 1.

First, it is determined whether the interchangeable lens 50 has been mounted on the second mount 45 of the mount adapter 30 (step 121). Whether or not the interchangeable lens 50 has been mounted on the second mount 45 is detected by the interchangeable lens mounting detection circuit 43 of the mount adapter 30. If the interchangeable lens 50 has not been mounted on the second mount 45 ("NO" at step 121), it is determined whether the interchangeable lens 50 has been newly mounted on the mount adapter 30 (step 122).

If the interchangeable lens 50 has been newly mounted on the mount adapter 30 ("YES" at step 122), then, in a manner similar to that described above, a command requesting the switch setting state is transmitted from the camera body 1 to the mount adapter 30 (step 123). In response to this command, data indicating the switch setting state is transmitted from the mount adapter 30 and is received by the camera body 1 (step 124), whereupon the switch setting state of the slide switch 31 of the mount adapter 30 is displayed on the display screen 16, as shown in FIG. 13. Thereafter, correction parameters conforming to the switch setting state of the slide switch 31 are read from the parameter memory 17 (step 126) and the read correction parameters are set in the camera body 1 (step 127).

If there is no imaging-quit instruction ("NO" at step 128), processing is repeated from step 121 onward.

This prevents an image correction from being performed based upon correction parameters set previously in a case where the interchangeable lens has been newly mounted on the mount adapter 30 with the power supply of the camera body 1 ON and the mount adapter 30 mounted on the camera body 1.

Figure 17:
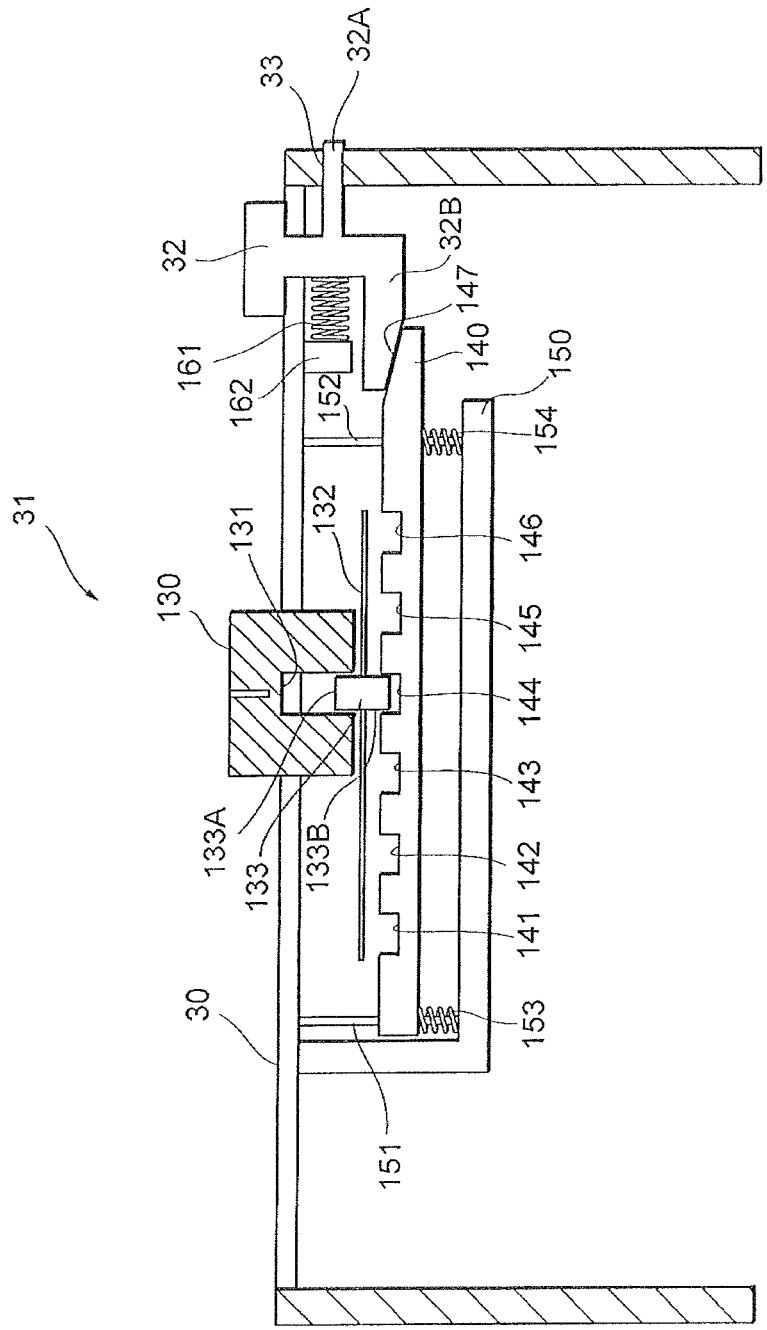
FIGS. 17 and 18 are sectional views taken along line XVII-XVII of FIG. 1.
Figure 18:
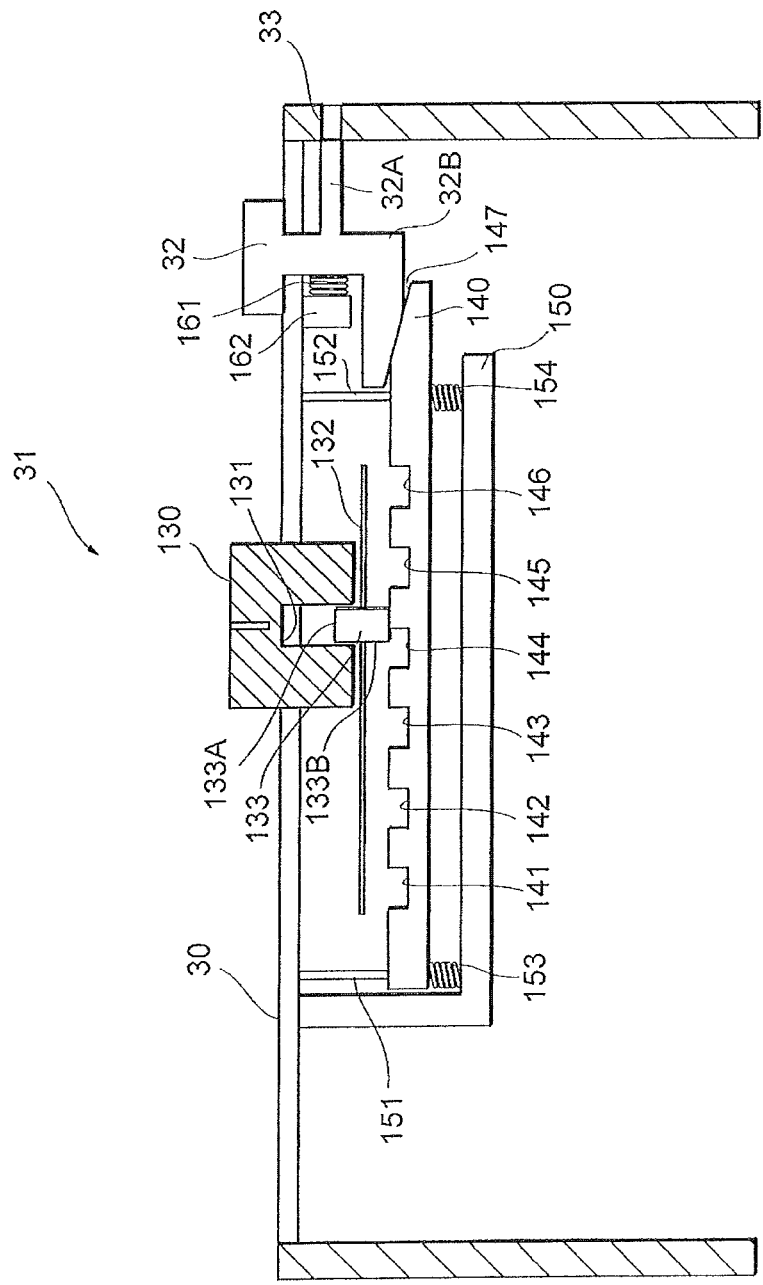

FIGS. 17 and 18 are sectional views taken along line XVII-XVII of FIG. 1.

The slide switch 31 of the mount adapter 30 includes a knob member 130 projecting to the outside of the mount adapter 30. The knob member 130 has a cross section in the shape of a cavity forming an internal recess 131. A contact member 133 has an upper portion 133A penetrating into the internal recess 131. Moving the knob member 130 in the horizontal direction causes the recess 131 of knob member 130 to move the upper portion 133A of the contact member 133 in the horizontal direction so that the contact member 133 moves horizontally along a slide shaft 132.

A positioning member 140 is provided along the horizontal direction so as to oppose the knob member 130. The positioning member 140 is placed on an L-shaped base 150. Support members 151 and 152 are secured to respective ones of both ends of the base 150. The support members 151 and 152 pass through both ends of the positioning member 140 with the positioning member 140 being free to move up and down. Biasing springs 153 and 154 are provided between the base 150 of the support members 151, 152 and the positioning member 140. The positioning member 140 is urged upwardly by the biasing springs 153 and 154.

The positioning member 140 is formed to have six recesses 141 to 146, which correspond to six settings. By moving the slide switch 31, a lower portion 133B of the contact member 133 is caused to penetrate any one of the recesses 141 to 146 so that the slide switch 31 is positioned.

The lens mounting/demounting switch 32 is provided on the right side of the slide switch 31. The lens mounting/demounting switch 32 is formed to have a horizontally extending lens fixing boss 32A. The lens fixing boss 32A passes through the insertion hole 33 formed in the second mount 45 on the front face of the mount adapter 30 and is free to project to the exterior of the mount adapter 30 and to withdraw into the interior of the mount adapter 30. A horizontally extending pushing member 32B is formed on the lens mounting/demounting switch 32 on the side thereof opposite the lens fixing boss 32A. The tip of the pushing member 32B is tapered and is in contact with a tip 147 (also tapered) of the positioning member 140.

Within the mount adapter 30 a biasing spring 161 secured to a fixing member 162 is provided on the left side of the lens mounting/demounting switch 32. The lens mounting/demounting switch 32 is urged in the rightward direction by the biasing spring 161.

When the interchangeable lens 50 is to be mounted on the mount adapter 30, the lens fixing boss 32A protrudes from the end of the mount adapter 30, as shown in FIG. 17, and the protruding lens fixing boss 32A fits snugly into a recess formed in the rear end of the interchangeable lens 50 so that the interchangeable lens 50 is mounted on the mount adapter 30.

When the interchangeable lens 50 mounted on the mount adapter 30 is to be removed from the mount adapter 30, the lens mounting/demounting switch 32 is slid leftward against the biasing force of the biasing spring 161, whereupon the tapered portion 147 of the positioning member 140 is pushed downward by the tapered portion of the pushing member 32B of the lens mounting/demounting switch 32, thereby lowering the positioning member 140. When this occurs, the lower portion 133B of the contact member 133 penetrating any one of the recesses 141 to 145 separates from this recess so that the setting of the slide switch 31 can be changed.

The setting of the slide switch 31 is possible in a case where the interchangeable lens 50 is removed from the mount adapter 30. In other cases the slide switch 31 is locked (although if the knob member 130 is moved forcibly against the biasing force of the biasing springs 153 and 154, the setting of the slide switch 31 can be changed). As a result, the slide switch 31 can be prevented from being moved accidentally.

In the foregoing embodiments, the switch provided on the mount adapter 30 is the slide switch 31 but is not limited to the slide switch; it will suffice if the switch is capable of multiple settings (as in the manner of a volume switch). Further, the switch is not limited to a mechanical switch and may be one utilizing software such as a touch-sensitive switch comprising a touch-sensitive panel formed on a display screen.

As many apparently widely different embodiments of the present invention can be made without departing from the spirit and scope thereof, it is to be understood that the invention is not limited to the specific embodiments thereof except as defined in the appended claims.

What is claimed is:

1. A camera body comprising:
    a switch setting state detection device for detecting setting state of a setting switch provided on a circumferential surface of a mount adapter mounted between a camera body and an interchangeable lens;
    a correction parameter memory for storing correction parameters, which correct a captured image, in accordance with states settable by said setting switch;
    a correction parameter readout device for reading out correction parameters, which correspond to the state of the setting switch detected by said switch setting state detection device, from said correction parameter memory;
    an image correction device for correcting the captured image using the correction parameters read out by said correction parameter reading device;
    a switch setting state change detection device for detecting whether the setting state of the setting switch has changed; and
    a display unit for displaying on a display screen the state of the setting switch detected by said switch state detection device in accordance with detection, by said switch setting state change detection device, of a change in the setting state of the setting switch, as well as the fact that the setting state of the setting switch has been changed, and for displaying on the display screen a live-view image obtained by pre-imaging;
    wherein said switch setting state change detection device detects, in response to display of the live-view image on the display screen, whether the setting state of the setting switch has changed.

2. The camera body according to claim 1, wherein said switch setting state detection device detects the setting state of the setting switch in response to turn-on of a power supply of the camera body.

3. The camera body according to claim 1, further comprising a mount adapter mounting detection device for detecting that said mount adapter has been mounted on said camera body;
  wherein said switch setting state detection device detects the setting state of the setting switch in response to detection, by said mount adapter mounting detection device, of mounting of said mount adapter on said camera body.

4. The camera body according to claim 1, further comprising an interchangeable lens mounting detection device for detecting that an interchangeable lens has been mounted on said mount adapter mounted on said camera body;
  wherein said switch setting state detection device detects the setting state of the setting switch in response to detection, by said interchangeable lens mounting detection device, of mounting of the interchangeable lens on said mount adapter.

5. A mount adapter mounted between a camera body and an interchangeable lens, comprising:
  a slide setting switch provided on a circumferential surface of the mount adapter; and
  a setting state data transmitting device for transmitting data, which represents the setting state of said setting switch, to the camera body;
  wherein said slide setting switch including:
  a knob member freely slidable along the circumferential surface of the mount adapter and formed to have a projection penetrating into the interior of the mount adapter;
  a positioning member formed to have recesses conforming to direction of movement of said knob member, the recesses corresponding to the number of states settable by said setting switch;
  a biasing mechanism for biasing said positioning member toward an inner circumferential surface of the mount adapter; and
  an engaging mechanism for engaging with the interchangeable lens as a result of the interchangeable lens having been mounted on the mount adapter, and when the interchangeable lens is removed from the mount adapter, for disengaging from the interchangeable lens and disengaging the projection of said knob member from a recess of said positioning member against biasing of said positioning member by said biasing mechanism.

6. The mount adapter according to claim 5, further comprising a setting state request data receiving device for receiving setting state request data transmitted from the camera body;
  wherein said setting state data transmitting device transmits data, which represents the setting state of said slide setting switch, to the camera body in response to receipt of the setting state request data by said setting state request data receiving device.

7. The mount adapter according to claim 5, further comprising:
  a mount adapter memory for storing data indicative of this mount adapter; and
  a mount adapter data transmitting device for sending the camera body the data, which is indicative of the mount adapter, stored in said mount adapter memory.

8. The mount adapter according to claim 7, further comprising a type request data receiving device for receiving type request data transmitted from the camera body;
  wherein said mount adapter data transmitting device, in response to receipt of the type request data received by said type request data receiving device, sends the camera body the data, which is indicative of the mount adapter, stored in said mount adapter memory.

9. A method of controlling operation of a camera body, comprising steps of:
  detecting setting state of a setting switch provided on a circumferential surface of a mount adapter mounted between a camera body and an interchangeable lens;
  reading correction parameters, which correct a captured image, from a correction parameter memory that stores correction parameters in accordance with states settable by the setting switch, the read correction parameters corresponding to the detected state of the setting switch;
  correcting the captured image using the read correction parameters;
  detecting whether the setting state of the slide setting switch has changed;
  displaying on a display screen the state of the setting switch detected by said switch state detection device in accordance with detection, by said switch setting state change detection device, of a change in the setting state of the setting switch, as well as the fact that the setting state of the setting switch has been changed, and displaying on the display screen a live-view image obtained by pre-imaging; and
  detecting, in response to display of the live-view image on the display screen, whether the setting state of the setting switch has changed.

10. A method of controlling operation of a mount adapter mounted between a camera body and an interchangeable lens, comprising steps of:
  providing a slide setting switch on a circumferential surface of the mount adapter;
  receiving setting state request data, which requests the setting state of the setting switch, transmitted from the camera body; and
  transmitting data, which represents the setting state of the setting switch, to the camera body in response to receipt of the setting state request data;
  wherein said slide setting switch including a knob member, a positioning member, a biasing mechanism and an engaging mechanism,
  wherein said knob member is freely slidable along the circumferential surface of the mount adapter and forms to have a projection penetrating into the interior of the mount adapter;
  wherein said positioning member forms to have recesses conforming to direction of movement of said knob member, the recesses corresponding to the number of states settable by said setting switch;
  wherein said biasing mechanism bias said positioning member toward an inner circumferential surface of the mount adapter; and
  wherein said engaging mechanism engages with the interchangeable lens as a result of the interchangeable lens having been mounted on the mount adapter, and when the interchangeable lens is removed from the mount adapter, for disengaging from the interchangeable lens and disengaging the projection of said knob member from a recess of said positioning member against biasing of said positioning member by said biasing mechanism.

* * * * *